United States Patent
Arola (10) Patent No.: US 10,310,645 B2
(45) Date of Patent: Jun. 4, 2019

(54) DISPLAY WINDOW WITH LIGHT STEERING

(71) Applicant: Microsoft Technology Licensing, LLC, Redmond, WA (US)

(72) Inventor: Joni Arola, Tampere (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/071,168

(22) Filed: Mar. 15, 2016

(65) Prior Publication Data

US 2017/0269742 A1 Sep. 21, 2017

(51) Int. Cl.
*G06F 3/041* (2006.01)
*G02B 5/02* (2006.01)
*G02F 1/1335* (2006.01)

(52) U.S. Cl.
CPC ......... *G06F 3/0412* (2013.01); *G02B 5/0263* (2013.01); *G02F 1/1335* (2013.01); *G02F 2001/133562* (2013.01); *G06F 2203/04103* (2013.01); *G06F 2203/04107* (2013.01)

(58) Field of Classification Search
CPC ......... G06F 3/0412; G06F 2203/04103; G06F 2203/04107; G02B 5/0263
USPC ....................................................... 345/173
See application file for complete search history.

(56) References Cited

U.S. PATENT DOCUMENTS

| | | | |
|---|---|---|---|
| 6,275,277 B1 | 8/2001 | Walker et al. | |
| 6,567,138 B1* | 5/2003 | Krusius | G02F 1/13336 349/73 |
| 8,080,879 B2 | 12/2011 | Shum | |
| 8,804,347 B2 | 8/2014 | Martisauskas | |
| 9,274,369 B1* | 3/2016 | Lee | G02F 1/133524 |
| 2011/0255301 A1* | 10/2011 | Watanabe | G02F 1/13336 362/558 |
| 2011/0299267 A1* | 12/2011 | Levon | F21V 5/00 362/84 |
| 2012/0049718 A1* | 3/2012 | Watanabe | G02F 1/13336 313/110 |
| 2012/0218219 A1 | 8/2012 | Rappoport et al. | |
| 2013/0088671 A1 | 4/2013 | Drzaic et al. | |
| 2013/0105833 A1 | 5/2013 | Weaver et al. | |

(Continued)

FOREIGN PATENT DOCUMENTS

| | | |
|---|---|---|
| WO | 2010041106 A1 | 4/2010 |
| WO | 2014011389 A2 | 1/2014 |
| WO | 2015050442 A1 | 4/2015 |

OTHER PUBLICATIONS

"How to maximise the active area of LCDs integrated with touchfoil™", Retrieved on: Nov. 4, 2015, 2 pages, Available at: http://touchfoilsupport.blogspot.in/2001/01/how-to-maximise-active-area-of-lcds.html.

(Continued)

*Primary Examiner* — Mark Edwards (57) ABSTRACT

An electronic device is provided. The device comprises a display module comprising an active area configured to emit light, and a window layer attached to the display module. The window layer comprises: a transparent area positioned above at least the active area of the display module, an area extending outwards relative to the active area of the display module, and an optical pattern configured to direct the light emitted by the active area of the display module near the edges of the active area towards the area of the window layer extending outwards.

20 Claims, 4 Drawing Sheets

(56) References Cited

U.S. PATENT DOCUMENTS

| | | | |
|---|---|---|---|
| 2013/0127922 A1 | 5/2013 | Poliakov et al. | |
| 2013/0279012 A1* | 10/2013 | Lee | G02B 3/0037 |
| | | | 359/622 |
| 2014/0042406 A1 | 2/2014 | Degner et al. | |
| 2014/0049522 A1 | 2/2014 | Mathew et al. | |
| 2014/0092028 A1* | 4/2014 | Prest | G06F 1/1643 |
| | | | 345/173 |
| 2014/0184512 A1 | 7/2014 | Okuley et al. | |
| 2015/0022754 A1* | 1/2015 | Jepsen | G02F 1/13336 |
| | | | 349/61 |
| 2015/0219820 A1* | 8/2015 | Stormberg | G02B 6/0025 |
| | | | 362/607 |
| 2016/0245995 A1* | 8/2016 | Feil | G02F 1/13336 |
| 2016/0366379 A1* | 12/2016 | Hickl | G02B 3/08 |
| 2017/0045769 A1* | 2/2017 | Watson | G02F 1/13336 |

OTHER PUBLICATIONS

Fakhry, Lisa, "LCD Panel Maximizes Active Area for Handheld Displays", Published on: Sep. 30, 2002, 7 pages, Available at: http://electronicdesign.com/boards/lcd-panel-maximizes-active-area-handheld-displays.

"AUO Presents World's Narrowest Border on 4.46-inch Panel Integration Technology", Published on: Oct. 29, 2012, 2 pages, Available at: http://www.auo.com/?sn=107&lang=en-US&c=10&n=1462.

"International Search Report and Written Opinion Issued in PCT Application No. PCT/US17/021230", dated Jun. 9, 2017, 10 Pages.

* cited by examiner

DISPLAY WINDOW WITH LIGHT STEERING

BACKGROUND

Consumer electronic devices with displays that span across the flat surface from edge to edge, or displays with curved edges, are becoming increasingly popular as the touchscreen based phones and tablets continue to develop. The displays in these devices are built in stacks of layers that can include an active layer which shows the actual image, touch sensing layer, protective cover windows and other layers. The active layers are normally surrounded with peripheral inactive regions, which hold circuitry needed for proper operation of the active part such as driver elements, contacts etc.

Several methods are used to conceal the inactive regions and make the active part of displays occupy most of the surface. The inactive regions can be concealed for example by covering them with an opaque material which resembles in color a display which is switched off, or by curving the display stack at the edges so that the inactive borders are positioned toward the bottom of devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A device with a display and window layer is described. The window layer covers the active part of the display and extends slightly further at the edges, covering also the inactive areas of the display or possibly other elements. The portion of the window layer which extends outwards includes an optical pattern, for example a light steering pattern, which directs light produced near the borders of the active display area also outwards. This substantially extends the active area of the display to the viewer. A method of manufacturing such device is also disclosed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

The embodiments described below are not limited to implementations which solve any or all of the disadvantages of known displays. Although the present examples are described and illustrated by a few layers separated with a filling, the devices described are provided as an example and not a limitation. As those skilled in the art will appreciate, the presented embodiments are suitable for application in a variety of electronic devices including stacks of layers instead of individual layers shown; so the individual layers shown can be a schematic representation of various parts of a device which comprise a plurality of layers.

In display devices, such as LCD (Liquid Crystal Display) or OLED (Organic Light-Emitting Diode) devices, a transparent window layer is used as a top layer for protection of the display. The transparent window layer covers the whole surface on the side of the device on which images are displayed, including inactive areas of the display below as well. One or more embodiments described herein are based on directing light emitted near the edges of the active area towards the outer area of the window which covers inactive areas. This is done by using an optical pattern near the edges of the window layer which helps direct the light (and images, for example) emitted by the active display into parts of the window layer which cover an otherwise inactive area of the display.

Throughout this specification, the terms 'top' and 'bottom' are used for clarity and relate to the positioning on the figures only. These terms are interchangeable. Figures in this application are of schematic character, and neither absolute nor relative proportions are observed in the drawings. Most of the smaller elements are oversized in order to be clearly distinguishable.

Figure 1A:
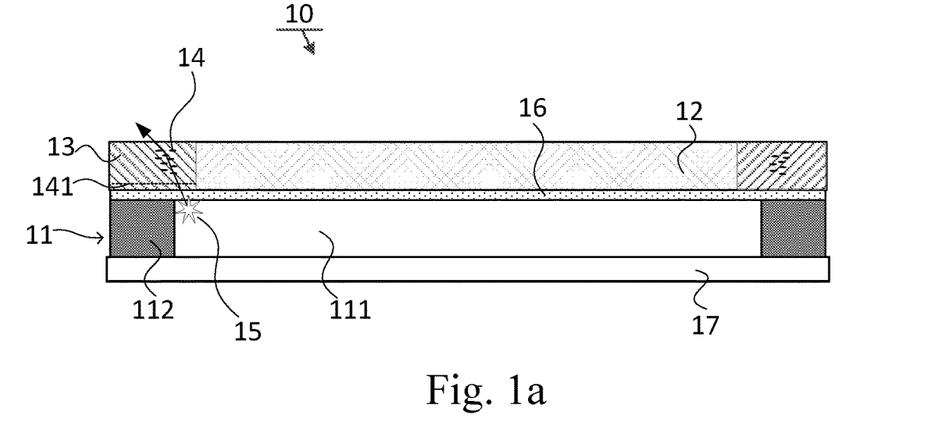
FIG. 1a is a schematic illustration of a device with an active layer emitting light, according to an embodiment.

FIG. 1a shows a device 10 comprising a display module 11 and a window layer 12. The device 10 may be an electronic device, a portable electronic device or any other electronic device with a display. For example, and without limitation, the device 10 may be a mobile phone, a tablet, a laptop or the like. The display module 11 comprises an active area 111 configured to emit light. The window layer 12 may be attached to the display module 11 by optically clear adhesives 16, as shown throughout FIGS. 1a-1c. However, as it is clear to a skilled person, the layer of adhesives 16 may not be necessary in some devices, and the display module 11 may be attached to the window layer 12 by other means.

The window layer 12 comprises a transparent area positioned above at least the active area 111 of the display module, an area 13 extending outwards relative to the active area 111 of the display module 11, and an optical pattern 14. The area 13 can extend outwards substantially in the plane of the display module, for example horizontally or along a curve of the edges. Material of the transparent area may also be substantially transparent to visible light. The optical pattern 14 is configured to direct the light, schematically shown as 15, emitted by the active area 111 of the display module 11 near the edges of the active area towards the area 13 of the window layer extending outwards. This provides an effect of modifying the image at the edges of the active display area 111, and displaying said image outside of the active area 111 due to the light steering in the window layer 12. A further technical effect produced by this is that, without the need to reduce the size of inactive areas 112 of the display module 11 physically, the visible active part of the display can still be "extended" to the viewer because the image at the edges can be extended towards the edges 13, and when the device 10 is switched off, the areas 13 can also merge with parts of the window layer 12 covering the active area 111 of the display unit 11. The pattern 14 may follow throughout the edges 13 of the window layer 12. The window layer 12 may be a flexible window layer comprising a transparent polymer, which provides the possibility to use this embodiment in a flexible device. In an embodiment, the window layer 12 is made of glass. This can provide a technical effect of improved protection and cost efficient manufacture, and the pattern 14 can be produced efficiently in glass by using for example a laser beam with controlled energy during manufacture.

According to an embodiment, the abovementioned elements of the device, including all parts of the window layer 12, the optical pattern 14 and the area extending outwards 13, are invisible to a human eye due to their small size and/or transparency to visible light. The pattern 14 is shown in black markings only for a clear visualization. The pattern 14 may comprise a light steering pattern configured to steer the light emitted by the active area 111 of the display module 11 near the edges of the active area towards the area 13 of the window layer 12 extending outwards. The pattern 14 may comprise specific light steering elements in the material of the window layer, which help achieve the desired light steering characteristics. The light steering elements may include refracting elements, reflective elements, deformation in the window layer material itself and/or magnification elements. The optical pattern 14 may optionally include a diffuser pattern 141 configured to scatter the light (scattered light not shown on the Figs.) which passes through the diffuser pattern 141 into the light steering pattern. Using a diffuser pattern 141 provides an even distribution of light and/or image quality. The optional diffuser 141 is presented by a dashed line on FIG. 1*a* under the rest of the light steering elements.

The pattern 14 may be produced by laser treatment, by adding external elements to the window material during manufacture of the window layer 12 or by any combination of these processes. According to an embodiment, elements of the pattern 14 are positioned at a predetermined distance and density so that the steering properties are consistent throughout the window layer 12.

In an embodiment, the device 10 also comprises a substrate 17 and inactive areas 112 of the display stack 11. The substrate 17 may serve as a basis for the stack, and the inactive areas 112 may comprise electric circuitry necessary for normal operation of the display stack 11.

The light emitted by the active area 111 may have a source such as a backlight. Alternatively or additionally, the active area 111 may comprise active elements (not shown in the figures), for example pixels, configured to emit light and form an image on the display module 11; and the optical pattern 14 is configured to direct the light 15 emitted by the active elements such that the image formed on the display module near the edges 112, 111 of the active area is projected to the area of the window layer extending outwards. This can be achieved for example by magnification or extension of the image by using magnifying elements in the pattern 14, steering and/or tilting the light emitted by the active elements near the edge of the active area 111.

According to an embodiment, the dimensions of the device are as follows. The thickness of the display module is between 0.05 mm to 2 mm the thickness of the window layer is between 0.1 mm and 3 mm, and the width of the area 13 of the window layer 12 extending outwards is 0.3 and 3 mm.

In an embodiment, the device 10 comprises at least one processor and a memory including computer program code. The device 10 of the embodiment can be any electronic device which includes the mentioned elements. The computer program code and the at least one memory are configured, with the at least one processor, to cause the device 10 to modify the image formed on the display module 11 near the edges of the active area 111 to optimize the projection of said image to the area of the window layer extending outwards 13. For example, if the image at the edges of the active display area 111 is magnified and tilted towards the outer part 13 of the window layer by the pattern 14, the device 10 can be programmed to shrink the image accordingly before displaying. Any other compensation for the effect of the optical pattern 14 is possible according to the embodiment. This provides a technical ability to tailor the image for proper projection onto the outer parts 13 of the window layer 12 on software level.

Since the optical pattern 14 is comprised in the window layer 12 material, it provides a technical effect of flexibility of light steering, magnification, extension or tilt. This is because by controlling the thickness of the window layer 12 and the outer parts 13 during manufacture, the depth and size of the optical pattern 14 can also be controlled. The thicker the window layer 12, the wider the area of light steering can be due to the properties of the optical pattern 14. The optical pattern 14 may be positioned at an edge (top, bottom or side) or in the bulk of the window layer 12.

The above embodiments described in relation to active screens which emit light, as well as embodiments discussed below with reference to FIGS. 1*c*, 2 and 3, can also be applied to devices with reflective displays. This is demonstrated schematically on FIG. 1*b* where the light source 15' is external, which indicates that the light needed to display an image on screen can have a source outside of the device 10 with the same effects of the present invention. The active reflecting area of the display module 11' may comprise reflecting elements in the place of active elements, such as pixels and others.

Figure 1B:
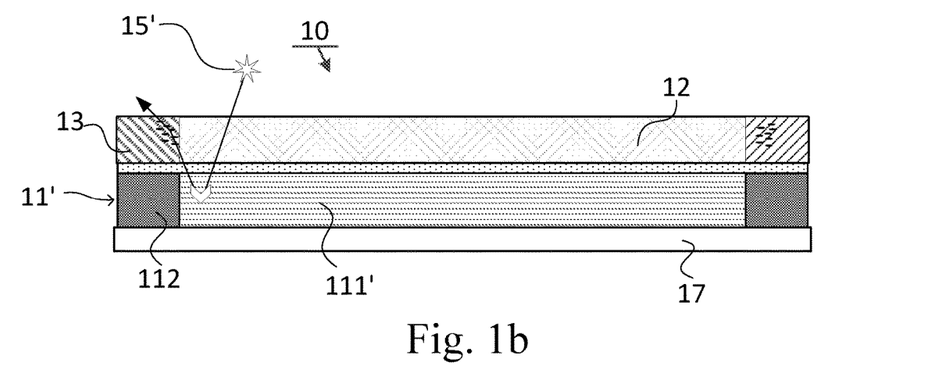
FIG. 1b is a schematic illustration of a device with an active layer reflecting light, according to an embodiment.

Only by way of example, the areas of the window layer extending outwards—areas 13—are shown to slightly overlap the active area 111 in FIG. 1*a*, and not overlap the active area 111' in FIG. 1*b*. This parameter may be varied in any combination with other parameters of the device 10. However, the positioning according to the embodiments shown on FIGS. 1*a* and 1*b* provides the effect of smooth transition of image into the optical pattern in case of a light-emitting display 11, and no obstruction to the light coming from the outside in reflective display 11' of FIG. 1*b*.

Figure 1C:
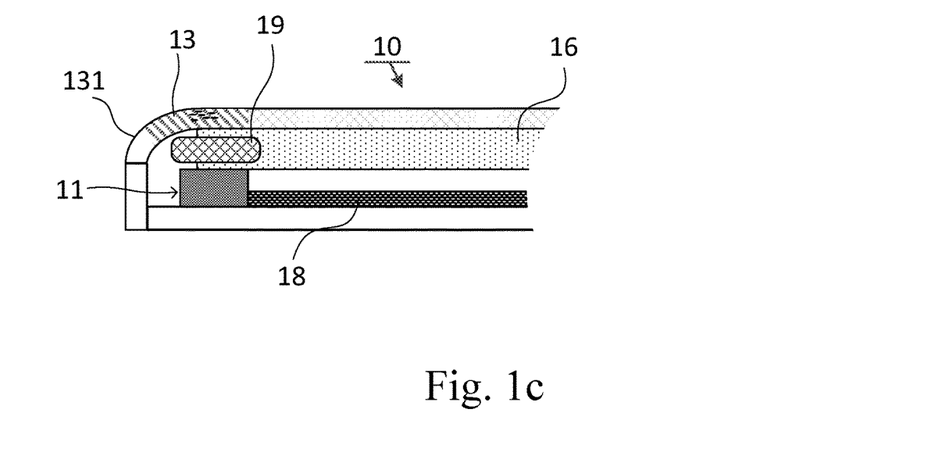
FIG. 1c is a schematic illustration of a device with curved edges, according to an embodiment.

FIG. 1*c* shows an embodiment wherein the area 13 of the window layer 12 extending outwards has a curved shape 131 along the edges of the display module. This figure is a side view of one of the edges of the device 10 on the left side of the drawing, wherein the device 10 may extend further to the right side of the drawing. The curved edge 131 shape may be desirable in portable device design. The curved edges 131 also further increase visibility of information projected. The area 13 of the window layer 12 extending outwards may extend in different directions on different ends of the device 10 depending on the shape at the edges, or extend substantially along the plane of the window layer (follow the shape) near its edges if the device 10 is flexible.

The device 10 shown on FIG. 1c also includes a touch-sensing layer 18, which provides the touch screen functionality to the display module 11. The touch sensing layer 18 may also be integrated in any of the above mentioned embodiments, such as the embodiments shown in FIGS. 1a and 1b. An additional touch-sensing element 19 can be provided to increase touch sensitivity along the curved edge 131 of the device 10. The additional element 19 can be attached to the display module 11 or the inner side of the curved edge 131. According to an embodiment, the touch sensing layer 18 and touch sensing element 19 comprise indium tin oxide (ITO) and are transparent to visible light.

FIGS. 1a-1c show embodiments wherein a large portion of the display module 11, and specifically the active area 111, are substantially flat. This is shown as an example only, and should not be seen as limiting. Other embodiments of the device 10 are possible, for example, the display module and/or the window layer may have a curved, convex, concave, wavy or rippled shape throughout their structure or in certain regions. In an embodiment, the device 10 is flexible and/or bendable, in which case the window layer 12 and the display module 11 are also flexible and/or bendable and may not necessarily remain flat as shown in the Figs.

Figure 2:
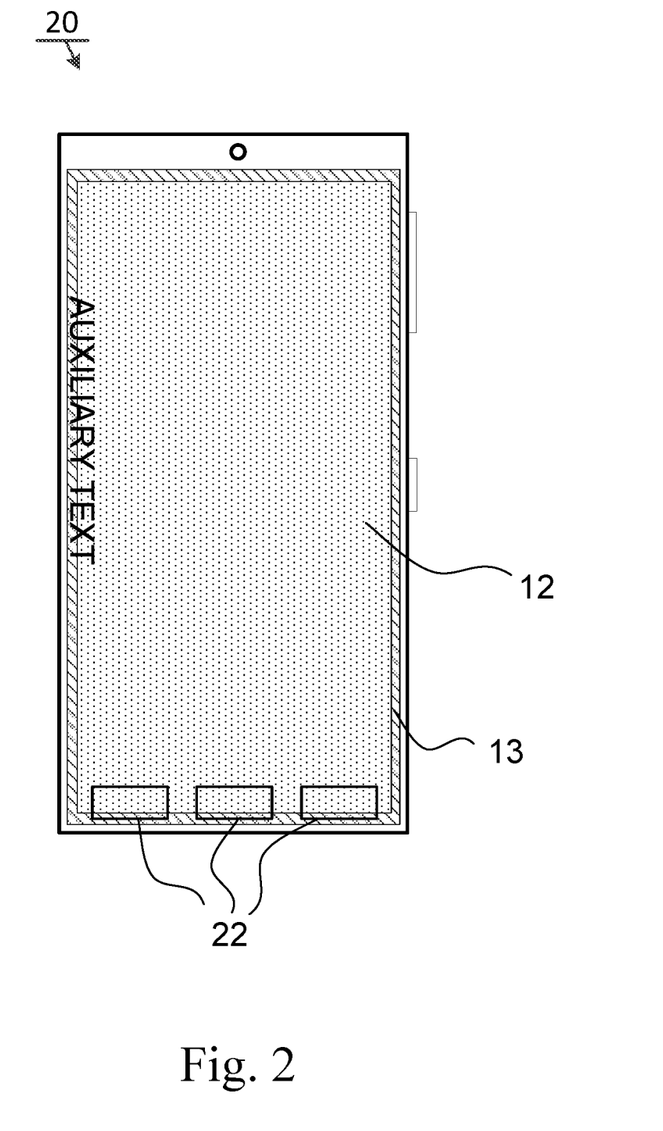
FIG. 2 is a schematic illustration of a mobile device according to an embodiment.
Figure 3:
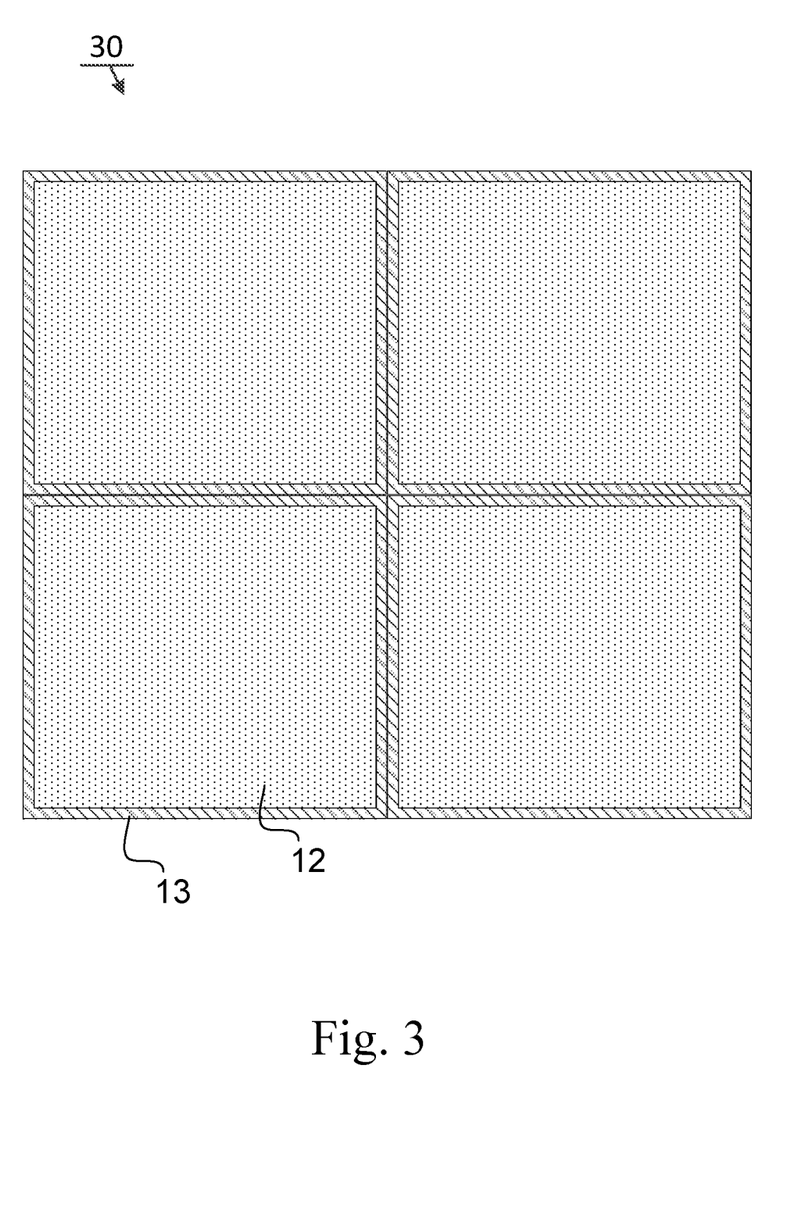
FIG. 3 is a schematic illustration of a split-screen system according to an embodiment.

FIGS. 2 and 3 provide example implementations of devices according to the abovementioned embodiments. FIG. 2 is a top view of a portable device 20, for example a mobile phone or a tablet. The device 20 comprises a window layer 12, and an area 13 of the window layer 12 extending outwards horizontally relative to the active area of the display module. In an embodiment where the device 20 curves at the edges or is bendable, the area 13 can extend outwards accordingly and is not limited to horizontal extension. The display module is not shown beneath the transparent window 12. The illustrated area 13 extends beyond the active area of the display, however the "AUXILIARY TEXT" and the virtual keys with possible images on them (not shown in FIG. 2) are displayed normally in these areas due to the optical pattern directing the light emitted by the screen near the edges and thereby extending the effective size of the active screen. Furthermore, if an additional touch-sensing element is added along the edges 13, similar to the element 19 on FIG. 1c, the virtual keys could be both displayed and used on the extended part 13 of the active display area projected to the window layer.

Devices according to any of the above embodiments can be used in electronic devices such as mobile phones, tablets, laptop computers, foldable laptop computers, flexible electronics and other devices with displays.

FIG. 3 shows a top view of a system 30 comprising a plurality of displays. The displays may be of any size, including Televisions, LCD monitors and mobile displays. The system 30 comprises two or more devices 10 as described earlier, placed next to each other to allow using them as a single larger screen. The system may also comprise a processing unit and a memory including computer program code, wherein the computer program code and the at least one memory unit are configured, with the at least one processing unit, to cause the devices to modify the image such that a single image on all the connected devices is formed. The areas 13 of the window layers 12 which extend outwards relative to the active area of the display modules allow for efficient merging of separate displays into one larger display by removing the distracting boundaries between the screens.

Figure 4:
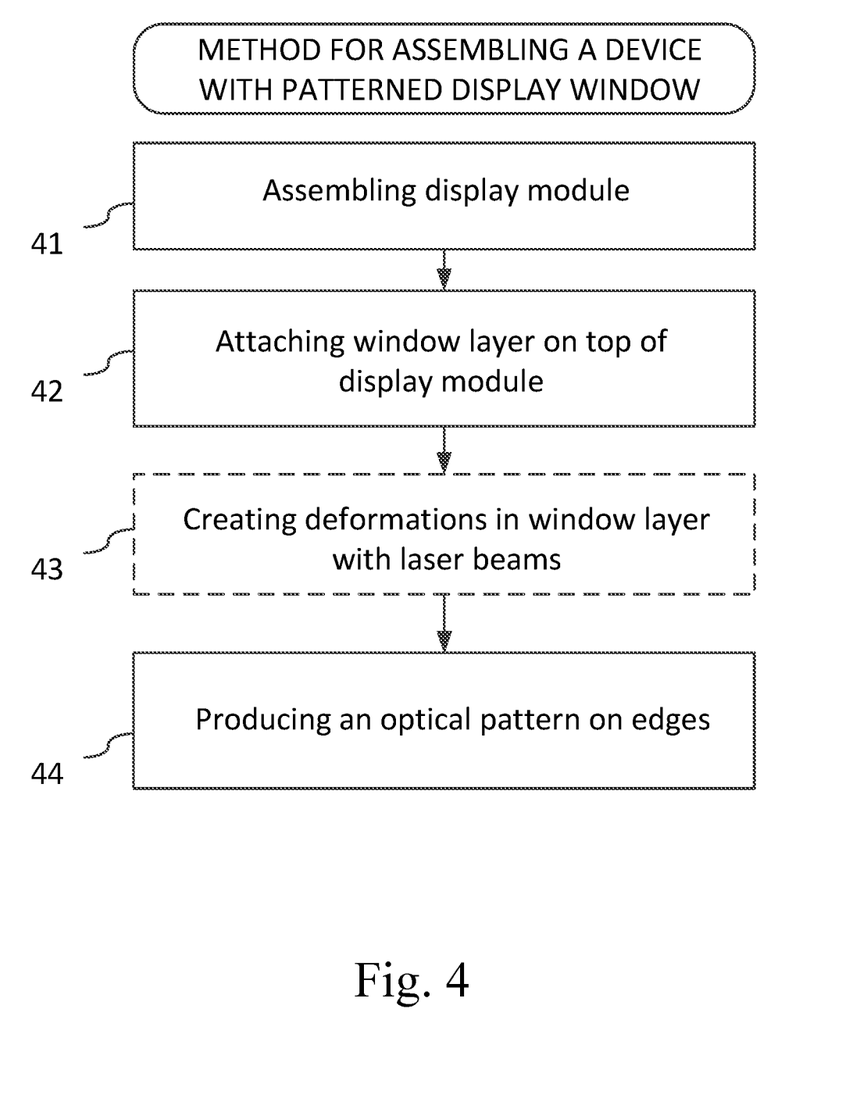
FIG. 4 is a flow chart representing method steps according to an embodiment.

FIG. 4 is a flow chart of a method of manufacturing a device with a display according to an aspect. The manufacturing begins with assembling 41 a display module comprising an active area configured to emit or reflect light. The display module may be, for example, one of the display modules presented in FIGS. 1a-1c. Next, a window layer is attached 42 to the top of the display element with optically clear adhesive. At 42, the window layer is positioned such that it covers the active area of the display module, and an area of the window layer extends outwards relative to the active area of the display module. Next, an optical pattern is produced 44 in the area of the window layer extending outwards. This is done by treating material of the window layer, for example by laser treatment, doping of the material or by adding elements of the optical pattern to the material during manufacture. The optical pattern can be produced 44 before or after the 42 attachment of the window layer. The optical pattern is configured to direct the light emitted or reflected by the active area of the display module near the edges of the active area towards the area of the window layer extending outwards.

In an embodiment, producing 44 the optical pattern includes placing 43 light steering elements in the material of the window layer in predetermined positions and at predetermined density. The configuration of the optical pattern can also be done by placing the light steering elements in predetermined positions. This may also be performed before or after attaching 42 of the window layer.

The above method can be cost efficient and simple to carry out, since a separate layer for light steering does not need to be manufactured.

According to an aspect, a device is disclosed. The device comprises: a display module comprising an active area configured to emit light, and a window layer attached to the display module. The window layer comprises: a transparent area positioned above at least the active area of the display module, an area extending outwards relative to the active area of the display module, and an optical pattern configured to direct the light emitted by the active area of the display module near the edges of the active area towards the area of the window layer extending outwards.

In an embodiment, the window layer is attached to the display module by a layer of optically clear adhesive.

In an embodiment, alternatively or in addition to the above embodiments, the area extending outwards is transparent to visible light.

In an embodiment, alternatively or in addition to the above embodiments, the optical pattern comprises a light steering pattern configured to steer the light emitted by the active area of the display module near the edges of the active area towards the area of the window layer extending outwards.

The optical pattern may further comprise a diffuser pattern configured to scatter the light which passes through the diffuser pattern into the light steering pattern.

The light steering pattern may further comprise a plurality of light steering elements in the material of the window layer.

In an embodiment, alternatively or in addition to the above embodiments, the window layer is a glass window layer.

In an embodiment, alternatively or in addition to the above embodiments, the active area of the display module comprises active elements configured to emit light and form an image on the display module. The optical pattern is configured to direct the light emitted by the active elements such that the image formed on the display module near the edges of the active area is projected to the area of the window layer extending outwards.

The device of the previous embodiments may comprise at least one processor and a memory including computer program code, wherein the computer program code and the at least one memory are configured, with the at least one processor, to cause the device to modify the image formed on the display module near the edges of the active area to optimize the projection of said image to the area of the window layer extending outwards.

In an embodiment, alternatively or in addition to the above embodiments, the display module comprises a touch-sensing layer.

In an embodiment, alternatively or in addition to the above embodiments, the area of the window layer extending outwards has a curved shape along the edges of the display module.

In an embodiment, alternatively or in addition to the above embodiments, the device comprises an additional touch-sensing element positioned between the area of the window layer extending outwards and at least one edge of the display module. The additional touch-sensing element may be positioned in the curved part if the area extended outwards and/or the edge of the display module have a curved shape.

According to an aspect, a device is disclosed. The device comprises: a display module comprising an active area configured to reflect light, and a window layer attached to the display module. The window layer comprises: a transparent area positioned above at least the active area of the display module, an area extending outwards relative to the active area of the display module, and an optical pattern configured to direct the light reflected by the active area of the display module near the edges of the active area towards the area of the window layer extending outwards.

In an embodiment, the area extending outwards is transparent to visible light.

In an embodiment, alternatively or in addition to the above embodiments, the optical pattern is transparent to visible light.

In an embodiment, alternatively or in addition to the above embodiments, the optical pattern comprises a light steering pattern configured to steer the light reflected by the active area of the display module near the edges of the active area towards the area of the window layer extending outwards.

In an embodiment, alternatively or in addition to the above embodiments, the display module comprises a touch-sensing layer.

In an embodiment, alternatively or in addition to the above embodiments, the area of the window layer extending outwards has a curved shape along the edges of the display module.

In an aspect, a method of manufacturing a device with a display is disclosed. The method comprises: assembling a display module comprising an active area configured to emit or reflect light; attaching a window layer with optically clear adhesives to the top of the display element, wherein the window layer is positioned such that the window layer covers the active area of the display module, and an area of the window layer extends outwards relative to the active area of the display module; and producing an optical pattern in the area of the window layer extending outwards by treating material of the window layer, wherein the optical pattern is configured to direct the light emitted or reflected by the active area of the display module near the edges of the active area towards the area of the window layer extending outwards.

In an embodiment of the method, the optical pattern in the area of the window layer extending outwards is produced by placing light steering elements in the material of the window layer in predetermined positions and at predetermined density, and wherein the light steering elements are placed in the material of the window by treating material of the window layer with laser beams with controlled energy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the effects described above may relate to one embodiment or may relate to several embodiments. The embodiments are not limited to those that solve any or all of the stated problems or those that have any or all of the described benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   a display module comprising an active area configured to emit light,
   a window layer attached to the display module, wherein the window layer comprises:
   a transparent area positioned above at least the active area of the display module,
   an area extending outwards relative to the active area of the display module, and
   an optical pattern configured below a surface of the window layer, the optical pattern comprising a plurality of light steering elements positioned in a material of the window layer at a distance from the surface of the window layer and extending from outside of edges of the active area and only within an inactive area to direct the light emitted by the active area of the display module near the edges of the active area towards the area of the window layer extending outwards.

2. A device as claimed in claim 1, wherein the window layer is attached to the display module by a layer of optically clear adhesive.

3. A device as claimed in claim 1, wherein the area extending outwards is transparent to visible light and the plurality of light steering elements is positioned only along a side edge of the window layer.

4. A device as claimed in claim 1, wherein the optical pattern comprises the light steering pattern configured to steer the light emitted by the active area of the display module near the edges of the active area towards the area of the window layer extending outwards, wherein the optical pattern is formed before attaching the window layer to the display module.

5. A device as claimed in claim 1, wherein the optical pattern further comprises a diffuser pattern configured to scatter the light which passes through the diffuser pattern into the light steering pattern.

6. A device as claimed in claim 1, wherein the plurality of light steering elements is formed at a depth within the material of the window layer by treating a material of the window layer to add the plurality of steering elements during manufacture of the window layer.

7. A device as claimed in claim 1, wherein the plurality of light steering elements extend outwards to the inactive area, wherein the area extending outwards relative to the active area is aligned with the inactive area.

8. A device as claimed in claim 1, wherein the active area of the display module comprises active elements configured to emit light and form an image on the display module; and the optical pattern is configured to direct the light emitted by the active elements such that the image formed on the display module near the edges of the active area is projected to the area of the window layer extending outwards.

9. A device as claimed in claim 8, comprising at least one processor and a memory including computer program code, wherein the computer program code and the at least one memory are configured, with the at least one processor, to cause the device to modify the image formed on the display module near the edges of the active area to optimize the projection of said image to the area of the window layer extending outwards.

10. A device as claimed in claim 1, wherein the display module comprises a touch-sensing layer.

11. A device as claimed in claim 1, wherein the area of the window layer extending outwards has a curved shape along the edges of the display module.

12. A device as claimed in claim 11, comprising an additional touch-sensing element positioned between the curved area of the window layer extending outwards and at least one edge of the display module.

13. A device, comprising:
a display module comprising an active area configured to reflect light,
a window layer attached to the display module, wherein the window layer comprises:
a transparent area positioned above at least the active area of the display module,
an area extending outwards relative to the active area of the display module, and
an optical pattern configured below a surface of the window layer, the optical pattern comprising a plurality of light steering elements positioned in a material of the window layer at a distance from the surface of the window layer and extending from outside of edges of the active area and only within an inactive area to direct the light reflected by the active area of the display module near the edges of the active area towards the area of the window layer extending outwards.

14. A device as claimed in claim 13, wherein the area extending outwards is transparent to visible light.

15. A device as claimed in claim 13, wherein the optical pattern is transparent to visible light.

16. A device as claimed in claim 13, wherein the optical pattern comprises the light steering pattern configured to steer the light reflected by the active area of the display module near the edges of the active area towards the area of the window layer extending outwards, wherein the optical pattern is formed before attaching the window layer to the display module.

17. A device as claimed in claim 13, wherein the display module comprises a touch-sensing layer.

18. A device as claimed in claim 13, wherein the area of the window layer extending outwards has a curved shape along the edges of the display module.

19. A method of manufacturing a device with a display, the method comprising:
assembling a display module comprising an active area configured to emit or reflect light;
attaching a window layer with optically clear adhesives to the top of the display element, wherein the window layer is positioned such that the window layer covers the active area of the display module, and an area of the window layer extends outwards relative to the active area of the display module; and
producing an optical pattern below a surface of the window layer in the area of the window layer extending outwards by treating a material of the window layer, the optical pattern comprising a plurality of light steering elements positioned in the material of the window layer at a distance from the surface of the window layer and extending from outside of edges of the active area and only within an inactive area, wherein the optical pattern is configured to direct the light emitted or reflected by the active area of the display module near the edges of the active area towards the area of the window layer extending outwards.

20. A method as claimed in claim 19, wherein the optical pattern in the area of the window layer extending outwards is produced by placing the plurality of light steering elements in the material of the window layer in predetermined positions and at predetermined density, and wherein the light steering elements are placed in the material of the window by treating material of the window layer with laser beams with controlled energy, and the optical pattern is formed before attaching the window layer to the display module.

* * * * *